Patented Mar. 10, 1936

2,033,195

UNITED STATES PATENT OFFICE 2,033,195

CAKE AND METHOD OF MAKING SAME

Morris H. Joffe, Chicago, Ill., assignor to Albert K. Epstein, Marvin C. Reynolds, and Benjamin R. Harris, Chicago, Ill., doing business as Epstein, Reynolds & Harris No Drawing. Application April 8, 1935, Serial No. 15,249

16 Claims. (Cl. 99—92)

My invention relates to an improved cake and method of making the same.

For the purpose of considering the present invention, cakes may be divided into so-called foam cakes which do not ordinarily employ shortening and usually do not employ a separate leavening agent of the baking powder type, and cakes employing shortening and which usually do include a leavening agent. In the making of a sponge cake, one type of conventional foam cake, egg material such as whole eggs, sugar and salt are first beaten together until the proper lightness is obtained. The flour is then slowly mixed in until the batter has been completed. The product is then baked and during the baking the moisture and air incorporated in the mixture expand, giving the cake its volume. Although a conventional sponge cake is relatively expensive on a batter pound basis, the unusually large volume obtained makes it possible to reduce the scaling weight and still produce a cake which is relatively large as compared to a somewhat heavier shortening cake. Although sponge cakes are a ready-selling product and are produced daily in substantially all bakeries, they have considerable disadvantage in many respects as compared to shortening cakes. One disadvantage is that they dry out very rapidly and even when fresh they often feel dry. Very often they have an eggy taste which is objectionable to many people, and usually are of a somewhat coarse and tough texture.

Many different expedients have been attempted for the purpose of improving the characteristics of a sponge cake, such as employing milk, employing substances for promoting the retention of moisture such as invert sugars, and the like, but heretofore it has been impossible to produce a sponge cake type of cake which avoids the objections which apparently are inherent in this character of cake. Those skilled in the art, of course, know that the problem cannot be solved by the incorporation of shortening, even in relatively small amounts, because even small amounts of shortening are inimicable to the air batter emulsion which is formed in the sponge cake dough.

The principal object of my present invention is to improve the character of foam cakes.

Another object is to produce an improved sponge cake.

Another object is the provision of an improved cake having the general characteristics of a foam cake but avoiding the disadvantages thereof.

A further object is the provision of an improved method for producing cake.

A still further object is to produce an improved cake.

Other objects and features of the invention will be apparent from the following description and will be pointed out specifically in the appended claims.

Generally, my invention is accomplished by producing a foam cake batter and a shortening cake batter, and then mixing these two batters together under certain conditions and employing certain proportions, depending upon the specific character of the improved cake desired, all in a manner which will be more specifically pointed out. The foam cake batter may employ any usual foam cake formula such as for a sponge cake, so-called "sunshine" cake, angel food cake, or the like. The shortening cake batter is preferably one having a relatively large amount of moisture derived from the egg material, milk and/or other aqueous liquids employed, and preferably also a relatively large amount of sugar. Both the water and sugar may be greater than the amount of flour employed, although in a very suitable formula, which will be pointed out, good results are obtained if in the shortening cake batter the amount of total aqueous material, such as milk, is approximately the same as the flour, amounts being based upon weight.

The shortening cake preferably includes a hydrophilic material, the character of which will be described, for promoting the incorporation of a greater amount of aqueous material and enriching ingredients in the shortening cake formula than can otherwise be used successfully and securing other advantages. A very suitable "hydrophilic material" is a substance, the individual molecules of which contain a lipophile group, that is, a group having an affinity for oils and fats, which lipophile group may be a fatty acid, or an acyl or alkyl radical attached to a polyhydroxy substance; and the polyhydroxy substance links at least one hydrophile group or groups, such as at least one free hydroxy group, a sulphate group, phosphate group, or the like, as will be pointed out more in detail hereinafter.

Considering the invention from the standpoint of improving sponge cakes, I have found that by mixing together a separately prepared sponge cake batter and a separately prepared shortening cake batter in suitable proportions, a cake is produced having the desirable characteristics of a sponge cake, but which does not possess the objections or disadvantages heretofore assumed to be inherent in this type of cake. The relative amounts of the two batters employed depend upon the product desired, that is, as to how nearly the product is to resemble a conventional sponge cake and how nearly the product is to resemble a conventional shortening cake. In this connection, I wish to call attention to the fact that the new cake is not merely a mixture, but an entirely new type of product. Although starting from a batter composed essentially of sponge cake dough and progressively increasing the amount of shortening batter incorporated therewith to a point where the batter consists essentially of shortening cake dough, there is a gradual change in properties or characteristics; nevertheless, throughout the entire range wherein the ratio is 90% to 10%, for example, the new cake presents distinctly different characteristics and is not merely a combination of the properties of the two batters.

For a further consideration of the invention, I shall refer somewhat in detail to formulæ employed in sponge cakes and shortening cakes and then illustrate the manner in which I carry out my invention for the purpose of securing results and advantages not obtainable when previously known types of cakes were made.

A type of old-fashioned sponge cake, as previously described, comprises whole eggs, sugar, salt (first beaten together) and flour (slowly stirred in). To overcome the objections of old fashioned sponge cake, commercial sponge cake is now made with milk. Many different types of formulæ are used of varying milk content. In some formulæ the sugar and whites are beaten up separately and then incorporated. In other formulæ the whole eggs are beaten up together.

Since milk will dissolve some of the sugar, the ratio of sugar to eggs can be made somewhat higher than in the old-fashioned sponge cake. In a typical formula, eggs, sugar and salt are beaten together until light. Milk in relatively small amounts, generally about one-third of the weight of the flour, is then slowly added. The flour and a small amount of baking powder are sifted together and added slowly. This type of cake when baked retains its moisture somewhat better than the old-fashioned sponge cake but it still dries out quickly and does not possess the tenderness of shortening cake. In general, also, it is not quite as light as the old-fashioned sponge cake.

To improve the keeping qualities of this latter type of cake, a small amount of shortening is added by some bakers. This shortening is melted and added last, the amount added being a variable factor depending upon the tenderness of the cake desired. Although the finished product has somewhat improved eating and keeping qualities, the addition of shortening decreases the volume of the cake in direct proportion to the amount of shortening added. From the standpoint of the baker this is objectionable because it necessitates an increased scaling weight and consequently increased cost. Furthermore, even a small amount of shortening is inimical to the air-batter emulsion, so the cake produced is in fact not a foam cake, but rather a shortening cake modified to resemble somewhat a conventional sponge or foam cake.

The milk style of sponge cake is also made with a formula involving the use of some agent calculated to promote the retention of moisture. Invert sugar is often used as the moisture retaining agent. This type of cake has somewhat better keeping qualities than the conventional sponge cake, but in general it has a coarse grain and a dry texture and dries out very quickly in comparison to the keeping qualities of high-grade shortening cakes.

It is obvious from the above consideration that many expedients have been utilized to improve the character of the sponge type of cake, or to produce a cake having sponge cake characteristics without its disadvantages, but that none of the proposals made or expedients utilized have been successful. By my improved method, however, I produce a cake having sponge cake characteristics, but without the attendant objections such as coarseness of texture, dryness, and the like.

As a specific example of carrying out my invention, I first prepare a sponge cake batter according to the following formula, the amounts given in each case being followed by a number in brackets indicating the percentage of the ingredient on the basis of the flour. Granulated sugar, 454 parts (113.5%), egg yolks frozen with 5% of salt and thawed, 123 parts (30.75%), liquid egg whites, 204 parts (51%), invert sugar, 73 parts (18.25%). These constituents are beaten until light and 22 parts of powdered skim milk dispersed in 196 parts of water (49% based upon the weight of the flour) are slowly stirred in. When the added water and powdered skim milk have been dispersed, the flour, baking powder and flavoring are added slowly. The amounts are 400 parts of flour (100%), 9 parts of baking powder (2.25%) and 4 parts of vanilla (1%).

The shortening cake batter, which is combined with the sponge cake batter, may be made according to the following formula. In each case after the quantity given, the percentage thereof based upon the weight of the flour is given in parentheses. 567 parts (100%) of flour, and 284 parts (50%) of shortening are creamed together for about five minutes. 624 parts (110%) of granulated sugar, 23 parts (4%) of baking powder, and 21 parts (3.7%) of salt, previously mixed together, are added to the creamed flour and shortening and mixed for about two minutes. 170 parts (30%) of granulated sugar are mixed with 426 parts (75%) of liquid egg whites in which between 5% and 7% of a relatively high molecular weight fatty acid polyglyceride with free hydroxy groups is dispersed, and this mixture is added relatively slowly to the previously prepared portion of the batter, and the whole mixed approximately two minutes. 62 parts of powdered skim milk are then dispersed in 562 parts (99%) of water with 4 parts of vanilla. These latter constituents are then added and the entire batter mixed. This produces a shortening batter for a so-called home type of white cake.

The foam cake (sponge cake) batter and shortening cake batter are then mixed together in suitable proportions to produce the final batter, preferably just enough mixing being employed to produce a substantially homogeneous batter product. I find that for best results the amount of baking powder employed in the sponge cake batter should be increased slightly when the sponge cake batter is employed for mixing with the shortening cake batter. For example, in the formula given, the amount of baking powder may be increased from 2.25%, based upon the weight of the flour, to 3¼%, which appears to be the most satisfactory range.

An example of one combination of the two illustrative batters described which produces very good results is 75% of the foam cake batter and 25% of the white shortening cake batter. When these two batters are mixed together in the proportion given, a batter of the following composition is produced. In each case after the amounts, the percentage of the ingredient based upon the flour appears in parentheses. Granulated sugar 597 parts (119%), egg yolks containing 5% of salt, 123 parts (24.6%), liquid egg whites, 204 parts (40.8%), liquid egg whites, containing 5% to 7% of polyglycerides with free hydroxy groups, 77 parts (15.4%), invert sugar 73 parts (14.6%), salt, 4 parts (0.8%), powdered skim milk, 33 parts (6.6%), water 297 parts (59.4%), flour 502 parts (100%), baking powder 17.6 parts (3.5%), shortening 51 parts (10.2%).

The cake produced by the method described and having the above set-out formula, when baked has substantially all of the desirable characteristics of a true sponge cake; the grain and texture, however, and keeping qualities are much superior to the sponge cake made according to conventional sponge cake formulas and methods. By comparison with formulas given for sponge cakes we find that the relative amount of sugar and relative amount of moisture derived from water and egg whites is considerably greater than the amount of these ingredients which it is possible to incorporate successfully in a sponge cake.

Another example of carrying out the invention consists in mixing together equal proportions of the sponge cake batter and white shortening cake batter. This batter, when produced, contains the following proportions of ingredients, in each case the percentage based upon the flour being shown in parentheses. Granulated sugar 882 grams (125.0%), egg yolk containing 5% salt 123 grams (17.4%), whites 204 grams (28.9%), whites with hydrophylic lipin added 230 grams (32.6%), salt 11 grams (1.6%), invert sugar 73 grams (10.3%), P. S. milk 55.6 grams (7.8%), water 499 grams (70.7%), flour 706 grams (100.0%), baking powder 28.5 grams (3.6%), shortening 153 grams (21.7%).

A cake made according to this formula produced by mixing the two batters together after they have been mixed separately, has sponge cake characteristics but shows an improvement over the previously described cake insofar as keeping qualities, texture, grain, tenderness, etc. are concerned.

In still another example I combine 25% of sponge cake dough and 75% of shortening dough to produce a cake of improved character. Such a cake contains about 132% of sugar based upon flour as 100% and a relatively large amount of total moisture approximately equal to the flour. While this cake shows a considerable loss of sponge cake characteristics, it nevertheless has different characteristics than a true shortening cake and is easily recognized by one skilled in the art as a distinctly different type of product.

It should be understood that my invention is not limited to the use of any particular percentage of the two types of batters, the examples given above being purely illustrative. As low as 10% of a shortening cake batter added to a sponge cake batter produces marked improvements in the character of the sponge cake readily recognizable by comparison with the best grades of sponge cake made without my invention.

My invention is applicable to the production of modified foam cakes of substantially any of the usual types. If desired, when producing the sponge type of cake, whole eggs may be employed in the shortening cake batter as well as in the sponge cake batter to produce a cake resembling more closely the sponge cake character. The so-called sunshine type of cake, made from yolks alone without whites, may also be produced. Cakes of the type of angel food cake containing no yolks but only whites can also be made. For example, if an angel food batter produced according to conventional formulæ is combined with a white cake type of batter employing shortening, a final cake of very desirable texture, grain, flavor and keeping qualities may be produced. The relative proportions of the two batters employed depends to a great extent upon the degree of modification desired. In general in the sponge type of cake, very suitable results are obtained and very excellent cake produced if approximately equal proportions of the two batters are combined.

The amount and character of the hydrophilic material used, specifically the hydrophilic lipins, may be varied considerably. In a preceding paragraph, I describe generally the character of these additional substances as employed in the shortening cake formulæ given by way of example. Preferably I employ hydrophilic lipins which in a sense are modified fats in that they have at least one group or groups having definite lipophilic or fatty characteristics with an affinity for oils and fats; and at least one hydrophilic group or groups having a definite affinity for aqueous media. The lipophile group may be an acyl or alkyl radical of relatively high molecular weight; from 8 carbons up but preferably 12 or more. The hydrophile group may be a hydroxy group or groups attached to the residue of a polyhydroxy substance having the acyl or alkyl group linked thereto, or the hydrophilic group may be a sulphate, sulphonic acid, sulpho fatty acid, or phosphate radical, for example, having a definite affinity for aqueous media. A few illustrative examples will disclose more fully the character of the hydrophilic lipins. In general, however, I may employ any of the substances described in Harris patents numbered 1,917,254, 1,917,256, and patents related thereto.

Examples of hydrophilic lipins wherein the hydrophilic character is imparted to the molecule by hydroxy groups of relatively high molecular weight fatty acid mono-esters of glycerine are mono-stearin, mono-olein, mono-palmitin and the like; fatty acid esters of other polyhydroxy substances such as sugars, polyglycols, polyglycerols, sugar alcohols and the like, wherein at least one hydroxy group is attached to the residue of the polyhydroxy substance, di-fatty acid esters of glycerine such as di-palmitin, di-olein, and the like. Examples of substances wherein the hydrophillic group is a sulphate or sulphonic acid radical may be any of the above in which one or more of the hydroxy groups in the above examples are esterified with a neutralized sulphate radical or replaced with a neutralized sulphonic acid radical. Sulpho-fatty acid radicals may also comprise the hydrophilic group, as, for example, in any of the hydroxy substances described, one or more hydroxy groups may be esterified with a relatively low molecular weight sulpho fatty acid. An example of this type of substance is mono-stearin sulphoacetate. Similarly, the same type of hydroxy substance may be employed to produce the phosphates which may also be used. Certain nitrogenous substances having a lipophile group and a hydrophilic nitrogenous group may be employed, such as quaternary ammonia derivatives of the type described in Harris Patent No. 1,917,252. I may also employ lecithin, although in general I prefer not to employ a nitrogenous substance which contains a choline linkage. I may also use oxygenated inorganic esters of relatively high molecular weight alcohols, such as stearyl sulphate, oleyl sulphate, cetyl phosphate, cetyl sulphoacetate and the like. Thus I may employ many different types of hydrophilic lipins wherein a single molecule contains a lipophile group and a hydrophile group. In general, however, I prefer to employ hydrophilic lipins which depend for their hydrophilic character upon the presence of one or more hydroxy groups such as glycerides and polyglycerides with free hydroxy groups, or mixtures thereof.

As a specific example of polyglycerides, I utilize a product produced in accordance with the following method. Substantially anhydrous glycerine is heated at about 260° C. with approximately one percent of caustic soda, preferably in an inert atmosphere for about two hours or until the polymerized product has an average molecular weight approximately equal to a diglyceride. The product may be still further polymerized if desired. This polymerized product is then esterified with fatty acids derived from any of the oils or fats of commerce such as cottonseed oil, palm oil, peanut oil, or the like, an excess of polyglycerol being employed so that the final product consists essentially of the mono-ester. Relatively pure fatty acids, such as commercial stearic acid, may also be used as a source of the lipophile group. The polyglycerol may be treated to drive off the unpolymerized glycerine before the esterifying step, or the unpolymerized glycerine may be allowed to remain. In place of esterifying the polyglycerol with fatty acids, I may re-esterify the polyglycerol directly with oils or fats to produce a product consisting essentially of a mixture of polyglycerides and monoglycerides which may be used very satisfactorily in my process. Diglycerides can be used in some cases, and mixtures of mono- and di-glycerides are suitable.

None of the hydrophilic lipins need be used in a pure state. Mixtures are suitable for the purpose and for some reasons may be preferred. For example, a mixture of mono-stearine and mono-stearine sulphoacetate (sodium salt) is satisfactory, besides many other mixtures, such as a mixture consisting essentially of monoglycerides and polyglycerides, as described in the preceding paragraph. Other hydrophilic materials may be used, such as hydrophilic colloids, vegetable gums and the like, but, in general, hydrophilic lipins of the character described are preferred.

It should not be assumed from the specific cake examples given that my invention is applicable only to the improvement of sponge cakes. It may be employed to advantage in making many different types of cakes wherein a foam cake batter and shortening cake batter are prepared separately and then combined.

When employing the invention with conventional sponge cake formulæ, the advantage secured may be one calculable primarily as the improvement only of sponge cake. The invention may also be viewed as a means or device for securing additional lightness, etc., in a conventional shortening cake, as, for example, when a relatively small amount (say 10% or more) of foam cake batter is incorporated in the shortening cake batter.

When the invention is applied to angel food cake, the advantage is not so much in improvement of the angel food cake. Rather an entirely new type of cake is produced, never known in the art before my invention.

Some advantages of my invention may be understood by considering the specific examples given as applied to sponge cake batter, shortening cake batter combinations of different proportions. In each case, after the example, the formula of the mixture or combination is given. In no case can such formulæ be employed successfully by employing any other method of compounding the ingredients, within my knowledge, than the method of my present invention. Not only is the method novel, therefore, but the product as well has never been produced heretofore.

While it is not entirely necessary in the practice of my invention to employ a hydrophilic lipin in the shortening cake batter, the results and advantages are greatly enhanced by their use.

What I claim as new and desire to protect by Letters Patent of the United States is:—

1. The method of producing an improved cake which comprises forming a foam cake batter, forming a shortening cake batter, and mixing together proportions of such batters.

2. The method of producing an improved cake which comprises forming a foam cake batter, forming a shortening cake batter having a relatively high moisture content, and mixing together proportions of such batters.

3. The method of producing an improved cake which comprises forming a foam cake batter, forming a shortening cake batter including a hydrophilic lipin, and mixing together proportions of such batters.

4. The method of producing an improved cake which comprises forming a foam cake batter, forming a shortening cake batter including a hydrophilic lipin in the form of a relatively high molecular weight fatty acid ester of a polyhydroxy substance wherein there is at least one free hydroxy group attached to the polyhydroxy residue, said shortening cake batter having a relatively large amount of moisture, and then mixing together proportions of the two batters.

5. The method of producing an improved cake which comprises forming a foam cake batter, forming a shortening cake batter having a relatively high moisture content and containing a proportion of a hydrophilic lipin, and then mixing together proportions of such batters.

6. The method of producing an improved cake which comprises forming a foam cake batter, forming a shortening cake batter having a relatively high moisture content and a relatively high sugar content, and mixing together proportions of such batters.

7. The method of producing an improved cake which comprises forming a foam cake batter, forming a shortening cake batter including a hydrophilic lipin and having a percentage of moisture greater than flour, and mixing together proportions of such batters.

8. The method of producing an improved cake which comprises forming a foam cake batter, forming a shortening cake batter including a hydrophilic lipin, said shortening cake batter containing a relatively large amount of moisture and a relatively large amount of sugar, and mixing together approximately equal proportions of such batters.

9. The method of producing an improved sponge cake which comprises forming a sponge cake batter, and adding thereto a proportion of a shortening cake batter having a relatively high moisture and sugar content.

10. The method of producing an improved sponge cake, which comprises forming a sponge cake batter including milk and a leavening agent, and adding thereto a proportion of a shortening cake batter having a relatively high moisture and sugar content.

11. The method of producing an improved shortening cake which comprises forming a shortening cake batter, and incorporating therewith a relatively smaller proportion of a foam cake batter.

12. The method of producing an improved cake which comprises forming an angel food batter, forming a shortening cake batter, and combining together proportions of said batters.

13. An improved cake having foam cake characteristics comprising a baked batter, said batter being a mixture of separately prepared foam cake and shortening cake batters, whereby the shortening of the shortening cake batter does not affect adversely the properties of the foam cake portion of the cake.

14. An improved cake having foam cake characteristics comprising a baked batter, said batter being a mixture of separately prepared foam cake and shortening cake batters, whereby the shortening of the shortening cake batter does not affect adversely the properties of the foam cake portion of the cake, said cake including a proportion of a hydrophilic lipin as a constituent of the shortening cake batter portion thereof.

15. An improved cake having foam cake characteristics comprising a baked batter, said batter being a mixture of separately prepared foam cake and shortening cake batters, whereby the shortening of the shortening cake batter does not affect adversely the properties of the foam cake portion of the cake, the proportions of sugar in said cake being greater than the proportion of flour.

16. An improved cake having foam cake characteristics comprising a baked batter, said batter being a mixture of separately prepared foam cake and shortening cake batters, whereby the shortening of the shortening cake batter does not affect adversely the properties of the foam cake portion of the cake, the said batter mixture before baking having a percentage of moisture greater than flour, whereby the baked cake is of high moisture content and has improved keeping qualities.

MORRIS H. JOFFE.